United States Patent [19]

Filipiev et al.

[11] 3,792,633
[45] Feb. 19, 1974

[54] VERTICAL MULTISPINDLE CONTINUOUS LATHE

[76] Inventors: Vadim Alexandrovich Filipiev, Yaltinskaya 7, kv. 19; Vyacheslav Vladimirovich Kogtev, Kakhovka 27, korpus 1, kv. 70; Tamara Tikhonovna Panferova, Petrozavodskaya 5, korpus 1 kv. 108; Stanislav Vasilievich Podsoblyaev, Bolshoi Devyatinski per 5, kv. 47, all of Moscow, U.S.S.R.

[22] Filed: Apr. 2, 1973

[21] Appl. No.: 346,906

Related U.S. Application Data

[63] Continuation-in-part of Ser. No. 316,559, Dec. 19, 1972, which is a continuation-in-part of Ser. No. 57,127, July 22, 1970, abandoned.

[52] U.S. Cl............................. 82/2.5, 82/2 D, 82/3, 29/38 A
[51] Int. Cl.............................................. B23b 13/04
[58] Field of Search .. 82/2 D, 3, 2.5; 29/38 A, 38 B

[56] References Cited
UNITED STATES PATENTS

| | | | |
|---|---|---|---|
| 1,782,138 | 11/1930 | Davis et al. | 82/3 X |
| 1,804,971 | 5/1931 | Bullard | 29/38 A |
| 1,807,829 | 6/1931 | Bullard | 82/2 D |
| 1,835,591 | 12/1931 | Bullard | 29/38 A |
| 3,200,472 | 8/1965 | Kohring et al. | 29/38 A |
| 1,574,726 | 2/1926 | Bullard | 29/38 A |

*Primary Examiner*—Leonidas Vlachos
*Attorney, Agent, or Firm*—Holman & Stern

[57] ABSTRACT

Each spindle assembly of the lathe has an individual drive and is arranged in a separated housing secured to a face of a rotatable pillar whose faces are intended for accommodating groups of tool rests so that the spindle of each assembly is positioned above the corresponding group of tools. The lathe is provided with a device for loading workpieces and a device for unloading finished articles, which makes the lathe fully automatic. The lathe is particularly effective for machining mass-production articles, e.g., pistons of internal combustion engines, when high efficiency, machining precision and good finish of surfaces are ensured.

2 Claims, 3 Drawing Figures

VERTICAL MULTISPINDLE CONTINUOUS LATHE

PRIOR APPLICATION

This application is a continuation-in-part of copending application Ser. No. 316,559, filed Dec. 19, 1972, which is a continuation of copending application Ser. No. 57,127 filed on July 22, 1970 and now abandoned, and entitled "Vertical Multispindle Continuous Lathe."

BACKGROUND OF THE INVENTION

The invention relates to metal working machines and more particularly to vertical multispindle continuous lathes.

The present invention is most effective when utilized for automatic precision turning in large-scale production of parts with low stiffness, e.g., pistons of internal combustion engines.

Known in the art are vertical multispindle continuous lathes comprising in combination: a machine bed; a central stationary vertical post mounted on the machine bed; a rotatable pillar having faces on its external surface and being concentrically disposed around said post; a drive for continuous rotation of the pillar; a plurality of spindle assemblies, each assembly having an individual drive and being arranged in a separated housing secured to a face of the pillar; a group of tool rests, each tool rest mounted on the pillar under a respective spindle assembly, and a copying (cam) means for control of the movement of the tool rest (cf. U.S. Pat. No. 1,782,138).

In these known lathes, the rotation of the pillar has to be discontinued each time for charging and discharging workpieces, which, naturally, affects the machine efficiency. Furthermore, the interruption of the pillar rotation for charging and discharging workpiece cannot but deteriorate the quality of finished produce due to unavoidable notches on their surface.

In the known machine, the drive for the rests, made as a copying or master form means, is located below the machining parts, where chips or cutting emulsion may interfere with its operation. As a result, the accuracy of the apparatus is affected.

Furthermore, in the known machine, the drive for rotating the pillar is arranged in the upper portion of the lathe (on the stationary vertical post) where its bulkiness serves to obstruct both the operation and maintenance of the machine.

SUMMARY OF THE INVENTION

It is an object of the present invention to eliminate the above-cited disadvantages.

Another vital object of the invention is to provide a vertical multispindle continuous lathe with a mutual arrangement of a drive for the continuous pillar rotation and a copying (cam) means for controlling the movement of the tool rests, which ensures maximum possible automation of the machine.

Still another vital object of the invention is to provide a disclosed lathe as which features higher productivity, as compared with the known machines of the same type, and improved machining accuracy with good surface finish of produced articles.

The above-recited and other objects of the invention are achieved by providing a vertical multispindle continuous lathe wherein, according to the invention, a drive for continuous rotation of the pillar is disposed in the lower portion of the machine bed while the copying (cam) means for controlling the movement of the tool rests is mounted on a stationary vertical post in its upper part. Further, the invention has provision for a device for loading workpieces and a device for unloading finished articles, either of the devices being linked kinematically with the drive for continuous rotation of the pillar.

Such an arrangement of the drive for continuous rotation of the pillar and the copying (cam) means for controlling the movement of the tool rests provides room for positioning the device for charging workpieces and the device for discharging finished articles and facilitates their easy kinematic coupling with the rotatable pillar. This, in its turn, permits loading of workpieces and the unloading of finished articles without momentarily stopping the lathe.

For a complete accomplishment of the objects of the invention, it is expedient that either of the devices for loading workpieces and unloading finished articles comprise a vertical shaft designed to bear a plurality of radially arranged clamp devices for workpieces which are being machined and for finished articles respectively on its upper end and a rigidly disposed gear which is rotated via a gear train of which the drive gear is rigidly secured on the rotatable pillar.

Due to this design, the lathe according to the instant invention ensures machining accuracy, is dependable and convenient in operation.

The invention will be more apparent from the description of its exemplary embodiment taken with reference to the appended drawings, wherein:

DETAILED DESCRIPTION OF A PREFERRED EMBODIMENT

Figure 1:
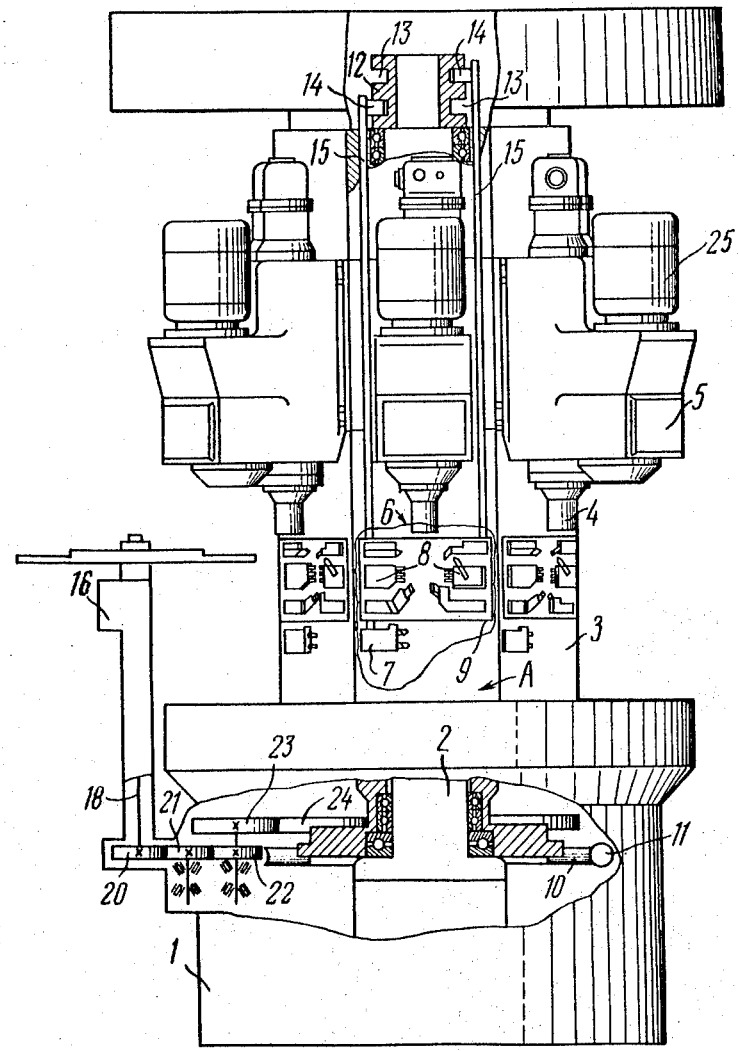
FIG. 1 is a diagrammatic view of the claimed vertical multispindle continuous lathe (general view)
Figure 2:
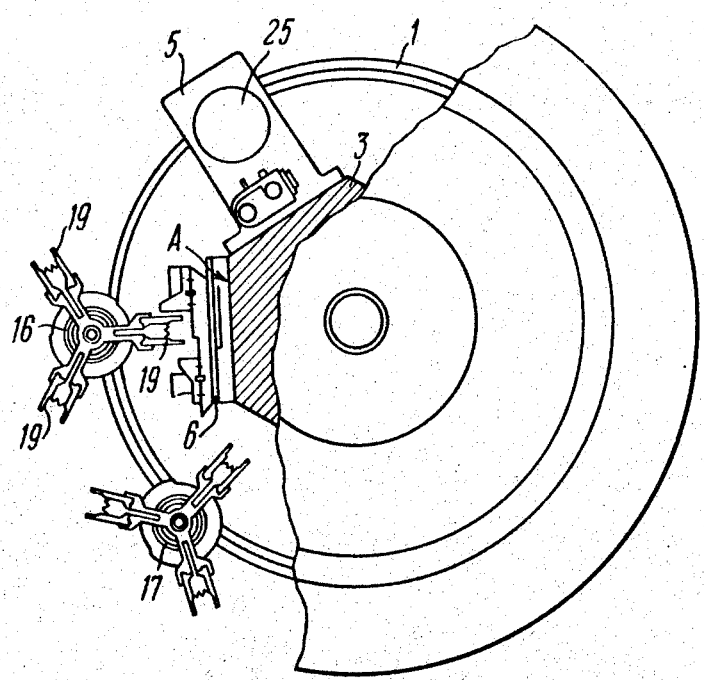
FIG. 2 is a partial cut-away (top view) of the lathe.
Figure 3:
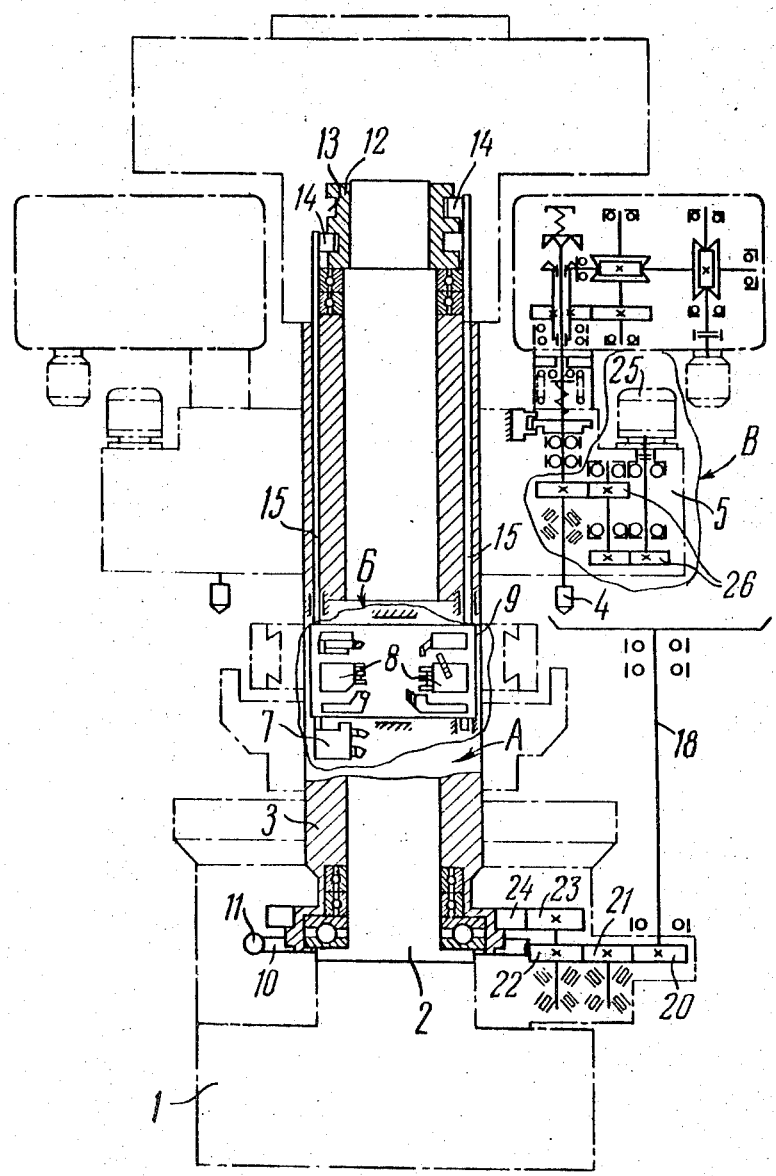
FIG. 3 is a power train diagram of the lathe.

A vertical multispindle continuous lathe comprises a machine bed 1 (FIGS. 1 – 3) with a central stationary vertical post 2 (FIGS. 2 and 3) rigidly secured thereon.

Concentrically disposed around the post 2 is a pillar 3 arranged for continuous rotation about the former. The rotatable pillar 3 has the shape of a hexahedron in its cross-section. Each face A of the pillar 3 bears a spindle assembly with a corresponding group of tool rests.

Each spindle assembly has an individual drive B for rotating a spindle 4 (FIGS. 1 and 3) and is accommodated in a separate housing 5 (FIGS. 1 – 3) secured to the face A of the pillar 3 so that the spindle 4 of each assembly is disposed above a group 6 of tool rests corresponding to it.

The arrangement of each spindle assembly in a separate housing 5 and the securing of its housing to the face A of the pillar 3 ensures high stiffness of the spindle assembly which allows the lathe to turn the parts with a high degree of precision.

Additionally, such an arrangement of the spindle assembly makes the proposed lathe easy to operate and improves, specifically, its maintenance. Should the assembly become faulty for some reason, it can be replaced promptly.

Furthermore positioning of the spindles above the tool rests facilitates the removal of chips.

A group 6 of the tool rests corresponding to the spindle 4 disposed above it comprises a longitudinal tool rest 7 (FIGS. 1 and 3) and a pair of cross tool rests 8 for rough and finish machining respectively. The tool rests 8 are mounted on a carriage 9.

The drive for the continuous rotation of the pillar 3 is mounted, according to the invention, in the lower portion of the machine bed 1. The drive comprises a worm gear whose worm wheel 10 is rigidly secured to the pillar 3 while a worm 11 is imparted rotation from a drive not shown in the figure.

Such an arrangement of the drive for rotation of the pillar 3 facilitates its operation considerably.

The copying (cam) means for controlling the movement of the groups 6 of the tool rests is made as a drum 12 positioned in the upper portion of the post 2 and coaxially with it, the drum being provided with two curvilinear grooves 13 (for longitudinal and transverse tool rests) accommodating therein rollers 14 connected to some of the ends of rods 15, the other ends of the rods 15 being connected respectively to the longitudinal tool rest 7 and to the carriage 9 designed to bear the cross tool rests 8.

Such an arrangement of the copying (cam) means protects it against metal chips and coolant with the result that machining accuracy is enhanced and surface finish improved.

Provided in the proposed invention is a device 16 (FIGS. 1 and 2) for charging workpieces and a device 17 (FIG. 2) for discharging finished articles, identical to the former both for design and kinematic coupling with the rotatable pillar 3. Either of these devices comprises a vertical shaft 18 (FIGS. 1 and 3) mounted for rotation on the machine bed 1 and several (three, in the exemplary embodiment being considered) clamp devices 19 spaced a part radially and equally in the upper portion of the shaft. The clamp devices 19 (FIG. 2) made as claws have a drive for clamping and unclamping workpieces, which may be of any known design fit for the purpose.

Rigidly secured on the lower end of the vertical shaft 18 is a gear 20 kinematically coupled, via a gear train 21, 22 and 23, with a gear 24 which is the drive one and set on the rotatable pillar 3.

Now let us consider an examplary embodiment of the claimed lathe for machining a piston of an internal combustion engine. As a part with low stiffness, it calls for a high machining accuracy.

The vertical multispindle continuous lathe is operated as follows.

From the drive of rotation of the pillar 3, rotation is imparted to the worm 11 which is engaged with the worm wheel 10 rigidly linked with the pillar 3. Rotatable together with the pillar 3 is the gear 24 transmitting motion, via the gear train 23, 22, 21 and the gear 20, on to the vertical shaft 18, as a result of which the devices 16 and 17 are brought into rotation.

In the course of the rotation of the shaft 18 of the device 16, one of its clamp device 19, which is unclamped, engages a workpiece being machined, i.e., a piston supplied from a feeder (not shown in the drawing). Thereafter, the piston is clamped by the clamp device 19 and transferred, at the moment of matching of the piston axis with the axis of the spindle 4, into a clamp device of the spindle 4 to be secured therein, the rotation of the clamp device 19 remaining uninterrupted.

The matching of the axes of the piston and the spindle is ensured owing to the matching of the gears 21, 22 and 23 making up the kinematic chain that link the rotatable pillar 3 with the shaft 18 bearing the clamp devices 19.

Either of the remaining two clamp devices 19 is successively transferring pistons from the feeder into the clamp device of each successive spindle 4. As there are six spindle assemblies on the proposed lathe with only three clamp devices 19, the r.p.m. of the shaft 18 must be twice as high as that of the pillar 3.

Once the workpiece, i.e., the piston, is secured in the clamp device of the spindle 4, the latter is rotated by an electric motor 25 of a drive B via a gear train 26.

With the rotation of the pillar 3 continuing, the rollers 14 of the copying (cam) means move along the curvilinear grooves 13 and draw the rods 15, displacing thereby the tool rests 7 and 8.

The finish operation thus begins. Each group 6 of the tool rests ensures complete turning of a piston, once it is installed, within a single turn of the pillar 3.

The turning completed, the tool rests return into their initial position, the machined piston is released from the clamp device of the spindle 4 and transferred into a discharging chute (not shown in the figure) by means of the clamps 19 of the device 17.

The continuous rotation of the pillar permits successive charging of the clamp devices of all the spindles with workpieces, their machining and discharging.

Thus, high speed productivity of the lathe is ensured, especially when machining such parts as pistons of internal combustion engines, with high machining accuracy and good surface finish of produced articles. The claimed lathe is fully automatized, easy and reliable to operate, which makes it particularly efficient in mass production, specifically, in motor industry.

What we claim is:

1. A vertical multispindle continuous lathe comprising in combination: a machine bed having upper and lower portions; a central stationary vertical post mounted on said machine bed; a pillar having faces on its external surface and disposed concentrically with said post and rotatable around it; a drive for continuous rotation of said pillar, positioned in the lower portion of said machine bed; a plurality of spindle assemblies for accommodating workpieces, each assembly having an individual drive arranged in a separate housing secured to one of said faces of the pillar; a plurality of groups of tool rests, each group being mounted on said pillar under a corresponding spindle assembly; copying means for controlling the movement of said groups of the tool rests, mounted on said stationary vertical post in its upper portion; first means for charging workpieces and second means for discharging finished workpieces, said first and second means being arranged on said machine bed and kinematically linked with said drive for continuous rotation of the pillar.

2. A lathe as claimed in claim 1, wherein either of said first means and said second means comprises a vertical shaft having several radially arranged clamps for clamping workpieces on its upper end and a rigidly secured gear on its lower end, said gear being rotated via a gear train the drive gear of which is rigidly fixed on said rotatable pillar, so that said vertical shaft and said rotatable pillar are kinematically coupled to each other.

* * * * *